US007581329B2

(12) United States Patent
Basham

(10) Patent No.: US 7,581,329 B2
(45) Date of Patent: Sep. 1, 2009

(54) DYNAMIC PERCENT GRADE MEASUREMENT DEVICE

(75) Inventor: Richard R. Basham, Kent, WA (US)

(73) Assignee: The Boeing Company, Chicago, IL (US)

( * ) Notice: Subject to any disclaimer, the term of this patent is extended or adjusted under 35 U.S.C. 154(b) by 145 days.

(21) Appl. No.: 11/740,142

(22) Filed: Apr. 25, 2007

(65) Prior Publication Data

US 2008/0263881 A1    Oct. 30, 2008

(51) Int. Cl.
*E01C 23/01* (2006.01)
(52) U.S. Cl. ............................. 33/521; 33/534; 33/365; 73/146; 701/1
(58) Field of Classification Search .................. 33/521, 33/523, 523.1, 523.2, 365, 366.11, 366.13, 33/366.14, 366.23–366.27, 1 H, 1 N, 1 Q, 33/1 PT, 333–335, 337, 338, 343, 264, 287, 33/288, 533, 534, 600, 624; 180/282; 73/146, 73/104, 105; 701/1, 207, 223
See application file for complete search history.

(56) References Cited

U.S. PATENT DOCUMENTS

| | | | | |
|---|---|---|---|---|
| 4,490,919 | A * | 1/1985 | Feist et al. | 33/290 |
| 6,119,353 | A * | 9/2000 | Gronskov | 33/1 Q |
| 6,618,954 | B2 * | 9/2003 | Kumazawa et al. | 33/533 |
| 6,688,167 | B2 * | 2/2004 | Ducros | 73/146 |
| 6,714,483 | B2 * | 3/2004 | Minami et al. | 367/125 |
| 6,912,478 | B1 * | 6/2005 | Face, III | 702/165 |
| 7,142,952 | B2 * | 11/2006 | Mekemson et al. | 701/1 |
| 2002/0013644 | A1 * | 1/2002 | Mekemson et al. | 701/1 |
| 2004/0173033 | A1 * | 9/2004 | Gilbert | 73/862 |

FOREIGN PATENT DOCUMENTS

| | | |
|---|---|---|
| DE | 19650629 | 6/1998 |
| EP | 1300287 | 4/2003 |
| JP | 1208289 | 8/1989 |
| JP | 09178479 A * | 7/1997 |
| JP | 2000283745 A * | 10/2000 |

OTHER PUBLICATIONS

Translations of JP2000283745A and JP09178479A from machine translator retrieved Oct. 21, 2008.*
UK Search Report on corresponding GB patent application (GB0807490.8) from UK Intellectual Property Office dated Aug. 6, 2008.
"Bruton Pocket Transit Instruction Manual"; The Brunton Company; Copyright 2000.

* cited by examiner

*Primary Examiner*—Amy Cohen Johnson
(74) *Attorney, Agent, or Firm*—Klein, O'Neill & Singh, LLP

(57) ABSTRACT

A combination of components for the dynamic measurement of the grade of terrain, including a rocker arm disposed horizontally across a reference structure, a first displacement transducer positioned at the first end of the rocker arm and a second displacement transducer positioned at the second end of the rocker arm. An absolute angle measurement device is positioned on the reference structure to provide the angle of the rocker arm relative to earth horizontal.

20 Claims, 1 Drawing Sheet

DYNAMIC PERCENT GRADE MEASUREMENT DEVICE

BACKGROUND

1. Field of the Invention

The invention relates generally to a percent grade measurement device.

2. Related Art

Motor vehicle leveling systems are known. Typically, vehicles are leveled by first sensing the degree of vehicle tilt along at least one axis that is disposed parallel to the tilt line that extends along the vehicle. The degree of tilt is determined to be the angle sensed along the respective axis as indicated by the output of the tilt sensor.

However, most leveling systems are unable to respond to vehicle dynamics and also cannot contemplate variable ground conditions, such as a change in the percent grade experienced at the point of ground contact. Generally, leveling systems are only able to accurately measure along the attitude of a vehicle along an axis upon which the tilt sensor is supported.

What is needed is an improved motor vehicle leveling assembly that overcomes the shortcomings of prior art leveling systems.

SUMMARY

In light of the foregoing background, a dynamic measurement device for measuring the grade of terrain under the wheel of a vehicle as the vehicle traverses over the terrain is provided according to the various embodiments of the present disclosure.

The dynamic measurement device measures localized grade changes on a scale more closely related to the size of the vehicle wheel. In addition, the measurements may be captured while the vehicle is moving. The measurements may then be time correlated with any other measurements of vehicle operating parameters. This allows much more specific information to be gathered on vehicle performance and events relative to very specific terrain events.

In one aspect, a combination of components is provided for the dynamic measurement of the grade of terrain. The components include a rocker arm disposed horizontally across a reference structure, the rocker arm having a first end and a second end; a first displacement transducer positioned at the first end of the rocker arm and a second displacement transducer positioned at the second end of the rocker arm. The first and second displacement transducers are positioned equidistant from a vertical centerline of the rocker arm. An absolute angle measurement device is positioned on the reference structure to provide the angle of the rocker arm relative to earth horizontal.

In another aspect, a method is provided for the dynamic measurement of the grade of terrain including providing a rocker arm disposed horizontally across a reference structure, the rocker arm having a first end and a second end; measuring a first displacement using a first displacement transducer positioned at the first end of the rocker arm; measuring a second displacement using a second displacement transducer positioned at the second end of the rocker arm, the first and second displacement transducers equidistant from a vertical centerline of said rocker arm; measuring the rise over run of the angle of the rocker arm relative to earth horizontal; and calculating a percent grade measurement using the first displacement, second displacement and rise over run of the angle of the rocker arm relative to earth horizontal measurements.

Additional advantages, objects, and features of the invention will be set forth in part in the detailed description which follows. It is to be understood that both the foregoing general description and the following detailed description are merely exemplary of the invention, and are intended to provide an over-view or framework for understanding the nature and character of the invention as it is claimed.

BRIEF DESCRIPTION OF THE DRAWINGS

Figure 1:
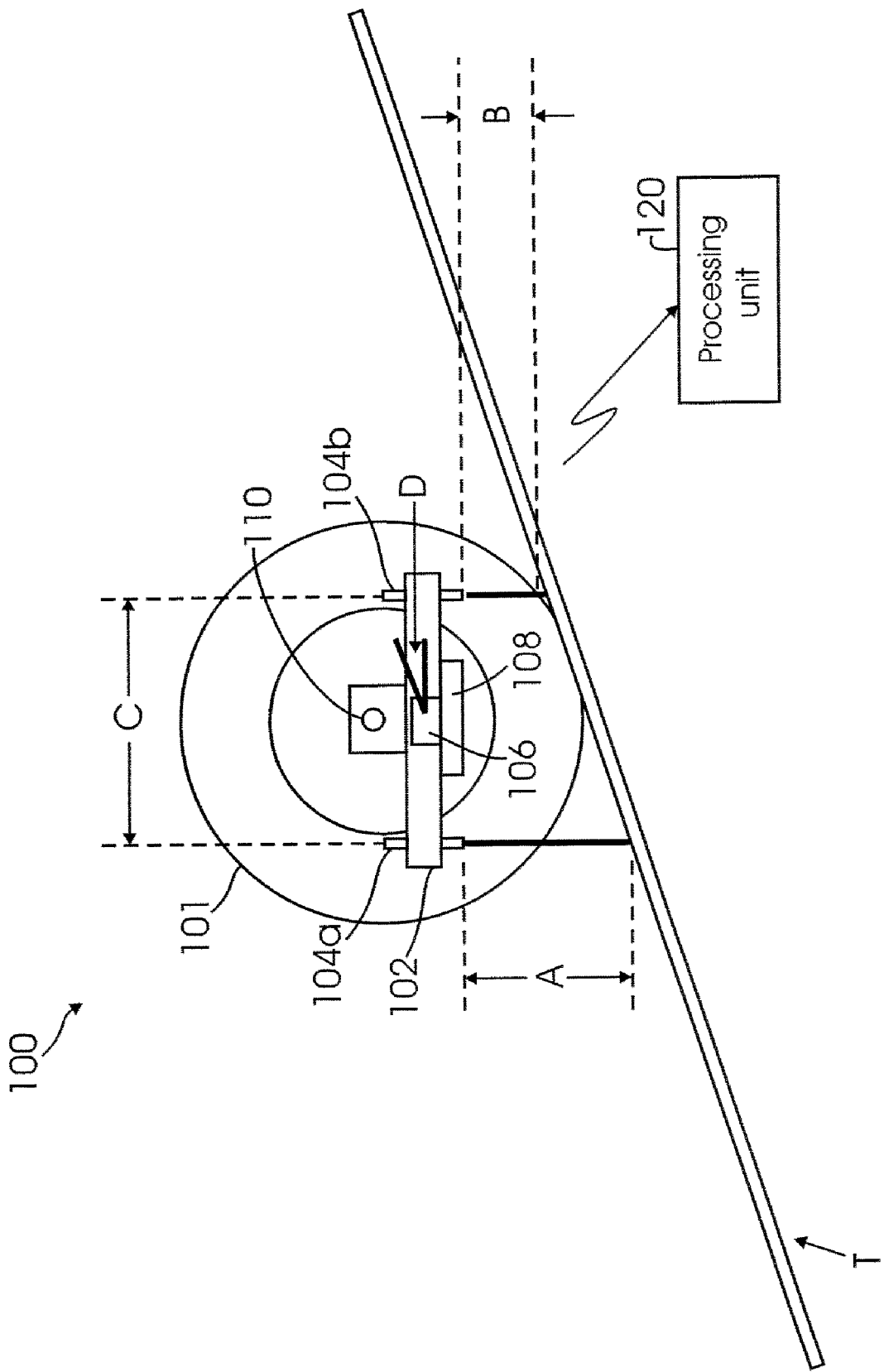

Having thus described the invention in general terms, reference will now be made to the accompanying drawings, which are not necessarily drawn to scale, and wherein:

FIG. 1 is a simplified illustration of a measurement device in accordance with an embodiment of the present invention.

DETAILED DESCRIPTION

The disclosure now will be described more fully hereinafter with reference to the accompanying drawings, in which some, but not all embodiments are shown. The disclosure may be embodied in many different forms and should not be construed as limited to the embodiments set forth herein. Like numbers refer to like elements throughout.

FIG. 1 is a simplified illustration of a measurement device 100 in accordance with an embodiment of the present disclosure. Measurement device 100 provides dynamic measurements of the grade of terrain T under a reference structure, such as the wheel of a moving vehicle.

In one embodiment, measurement device 100 is appropriately mounted on a reference structure to be measured, for example, wheel 101. It should be understood that measurement device 100 does not need to be mounted directly on the reference structure to be effective, but may be mounted on a frame or other structure positioned ahead or behind the reference structure.

Measurement device 100 may include a balanced rocker arm 102, first and second non-contacting displacement transducers 104a and 104b, and tilt sensor 106 to measure the absolute angle with respect to gravity. The methodology used for either the non-contacting displacement transducers 104 or tilt sensor 106 may vary with respect to the application.

In one embodiment, rocker arm 102 extends along the beam width of wheel 101. Rocker arm 102 is allowed to swing or pivot with respect to wheel 101 so as to maintain a generally level relationship with respect to gravity.

In one embodiment, rocker arm 102 extends along the beam width of wheel 101. Rocker arm 102 is allowed to pivot with respect to wheel 101, yet maintains a generally level relationship with respect to gravity, as wheel 101 traverses terrain T. To accomplish this, a ballast weight 108 is coupled below the point of rotation 110 of rocker arm 102, which adds stability to the orientation of rocker arm 102. This results in providing a relatively stable reference platform for horizontal and vertical measurement with respect to gravity. In one exemplary embodiment, a rotational damper positioned at pivot point 110 may be used, while wheel 101 is traversing terrain T, to further reduce any swinging or pivoting movement experienced by rocker arm 102 during, for example, the lateral acceleration and deceleration of wheel 101. This results in providing an increasingly stable reference platform for horizontal and vertical measurement with respect to gravity.

From this relatively stable reference platform, a pivot-centered, differential displacement measurement may be made with respect to terrain T, using first and second displacement transducers 104a and 104b.

Displacement transducers 104a and 104b may be mounted on rocker arm 102 in any desired position along the beam width thereof. Accordingly, rocker arm 102 may then be balanced, if necessary, in a manner known to those of ordinary skill in the art to compensate for the positioning.

In one exemplary embodiment, displacement transducers 104a and 104b may be mounted toward the ends of rocker arm 102 on wheel 101, centered across the beam width thereof and equidistant from the center line between the center of the pivot point 110 and the center of gravity of ballast weight 108. In this exemplary embodiment, by positioning displacement transducers 104a and 104b equidistant from pivot point 110, rocker arm 102 is conveniently balanced. The distance between displacement transducers 104a and 104b defines the granularity of the percent grade measurement.

Each sensor 104a and 104b measures the distance between its location on rocker arm 102 and terrain T. For example as shown in FIG. 1, distance A is equal to the distance to terrain T from displacement transducer 104a. Distance B is the measure of the distance to terrain T from displacement transducer 104b.

Displacement transducers 104a and 104b may be any conventional displacement transducers and may operate using laser and ultrasound. Suitable laser transducers are available commercially from, for example, Scantron Industrial Products Ltd, Taunton, England and ultrasonic transducers are commercially available from Senix Corporation, Bristol, Vt., USA.

For vehicles that may be traversing over rails eddy current transducers are available from MICRO-EPSILON MESSTECHNIK GmbH & Co.

Tilt sensor 106 may be used to measure the rotational instability (i.e. swinging motion) of rocker arm 102 caused by the lateral acceleration and deceleration of wheel 101. As previously mentioned a rotational damper may be used at rotation point 110 to help improve the generally level orientation of the rocker arm 102 while wheel 101 traverses terrain However, to the extent that at the time the measurement may be taken rocker arm 102 is not stable relative to gravity; tilt sensor 106 may be used to compensate for the difference, by indicating the real-time angle of rocker arm 102 with respect to gravity.

The data from tilt sensor 106 may be used to account for the instability of rocker arm 102, either directly or computationally.

In addition, tilt sensor 106 may be used to account for any offsets from the level reference, especially when wheel 101 is static, caused, for example, by the imprecise placement of any components of measurement device 100.

Tilt sensor 106 may be any type of conventional tilt sensor, for example, an inclinometer, DC accelerometer, magnetometer, gyro, electrolytic tilt sensor, capacitive inclination device, and force balance accelerometer.

In combination, displacement transducers 104a and 104b and tilt sensor 106 along with rocker arm 102 and ballast weight 108, make measurement device 100 functional for the purposes intended. The signals provided by displacement transducers 104a and 104b and tilt sensor 106 are recorded and processed to provide raw measurement data. The raw data may be stored and processed at wheel 101, for example, with an on-board processing unit 120 or the data may be transmitted via flexible wires or wirelessly to a remote processing unit 120, as shown in FIG. 1.

The raw measurement data may be used in an algorithm to provide a percent grade measurement of terrain T experienced at wheel 101.

In one embodiment, the following formula may be used to calculate the percent grade using the raw data:

$$\% \text{ Grade} = (((B-A)/C) - D) \times 100$$

where A is equal to the distance to terrain T from displacement transducer 104a, B is equal to the distance to terrain T from displacement transducer 104b, C is equal to the distance between the two displacement transducers 104a and 104b, and D is equal to the rise over run of the angle of rocker arm 102 relative to earth horizontal as measured by tilt sensor 106.

It is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A combination of components for the dynamic measurement of the grade of terrain comprising:
    a rocker arm extending along a beam width of a reference structure, the rocker arm having a first end and a second end, the rocker arm allowed to swing or pivot to maintain a substantially level relationship with respect to gravity;
    a first displacement transducer positioned at said first end of the rocker arm and a second displacement transducer positioned at said second end of the rocker arm, said first and second displacement transducers equidistant from a vertical centerline of said rocker arm; and
    an absolute angle measurement device positioned on said reference structure to provide the angle of the rocker arm relative to earth horizontal.

2. The combination of components of claim 1, wherein said reference structure is a wheel of a vehicle.

3. The combination of components of claim 1, wherein said first and second displacement transducers comprise a laser displacement measurement device.

4. The combination of components of claim 1, wherein said first and second displacement transducers comprise an ultrasound displacement measurement device.

5. The combination of components of claim 1, wherein said first and second displacement transducers comprise an eddy current displacement measurement device.

6. The combination of components of claim 1, wherein said absolute angle measurement device comprises an inclinometer.

7. The combination of components of claim 1, wherein said absolute angle measurement device comprises an accelerometer.

8. The combination of components of claim 1, further comprising a processing unit, wherein said processing unit receives measurement data signals from said first and second displacement transducers and said absolute angle measurement device and calculates a percent grade measurement.

9. The combination of components of claim 8, wherein the following formula is used to calculate the percent grade:

$$\% \text{ Grade} = (((B-A)/C) - D) \times 100$$

where A is equal to the distance to the terrain from the first displacement transducer, B is equal to the distance to the terrain from the second displacement transducer, C is equal to the distance between the first and second displacement transducers, and D is equal to the rise over run of the angle of the rocker arm relative to earth horizontal as measured by the absolute angle measurement device.

10. A combination of components for the dynamic measurement of the grade of terrain comprising:

a rocker arm disposed across a wheel of a vehicle, the rocker arm having a first end and a second end, the rocker arm allowed to pivot about a pivot point substantially midway between the first end and the second end;

a rotational damper positioned adjacent the pivot point to maintain the rocker arm at a substantially level relationship with respect to gravity;

a first displacement transducer positioned at said first end of the rocker arm and a second displacement transducer positioned at said second end of the rocker arm, said first and second displacement transducers equidistant from a vertical centerline of said rocker arm;

a tilt sensor positioned on the rocker arm to provide the angle of the rocker arm relative to earth horizontal; and a processing unit to process measurement data signals from said first and second displacement transducers and said tilt sensor and calculates a percent grade measurement using the following formula:

$$\% \text{ Grade} = (((B-A)/C) - D) \times 100$$

where A is equal to the distance to the terrain from the first displacement transducer, B is equal to the distance to the terrain from the second displacement transducer, C is equal to the distance between the first and second displacement transducers, and D is equal to the rise over run of the angle of the rocker arm relative to earth horizontal as measured by the tilt sensor.

11. A method for the dynamic measurement of the grade of terrain comprising:

providing a rocker arm disposed across a reference structure, the rocker arm having a first end and a second end, the rocker arm allowed to swing to maintain a substantially level relationship with respect to gravity;

measuring a first displacement using a first displacement transducer positioned at said first end of the rocker arm;

measuring a second displacement using a second displacement transducer positioned at said second end of the rocker arm, said first and second displacement transducers equidistant from a vertical centerline of said rocker arm;

measuring the rise over run of the angle of the rocker arm relative to earth horizontal; and calculating a percent grade measurement using the first displacement, second displacement and rise over run of the angle of the rocker arm relative to earth horizontal measurements.

12. The method of claim 11, wherein said calculating a percent grade measurement includes calculating a percent grade measurement using the following formula:

$$\% \text{ Grade} = (((B-A)/C) - D) \times 100$$

where A is equal to the distance to the terrain from the first displacement transducer, B is equal to the distance to the terrain from the second displacement transducer, C is equal to the distance between the first and second displacement transducers, and D is equal to the rise over run of the angle of the rocker arm relative to earth horizontal.

13. The method of claim 11, wherein said first and second displacement transducers comprise a laser displacement measurement device.

14. The method of claim 11, wherein said first and second displacement transducers comprise an ultrasound displacement measurement device.

15. The method of claim 11, wherein said first and second displacement transducers comprise an eddy current displacement measurement device.

16. The method of claim 11, wherein said measuring the rise over run of the angle of the rocker arm relative to earth horizontal is accomplished using an absolute angle measurement device.

17. The method of claim 16, wherein said absolute angle measurement device comprises an accelerometer.

18. The method of claim 16, wherein said absolute angle measurement device comprises an inclinometer.

19. The method of claim 16, wherein calculating a percent grade measurement comprises receiving measurement data signals from said first and second displacement transducers and said absolute angle measurement device at a processing unit.

20. The method of claim 19, wherein said receiving measurement data signals comprises receiving measurement data signals wirelessly.

* * * * *